J. R. COOK.
POWER TRANSMITTING DEVICE.
APPLICATION FILED AUG. 7, 1916
1,260,650.
Patented Mar. 26, 1918.
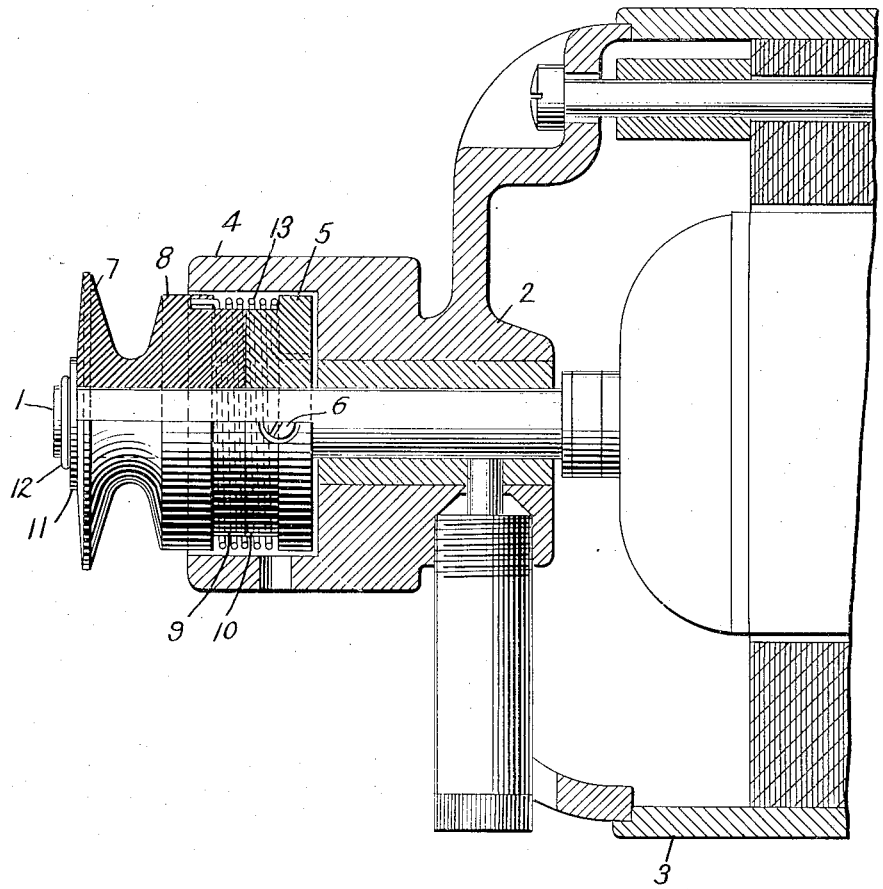
WITNESSES:
Fred H. Miller
O. W. Kennedy
INVENTOR
Joel R. Cook
BY
Wesley G. Carr
ATTORNEY

UNITED STATES PATENT OFFICE.

JOEL R. COOK, OF WILKINSBURG, PENNSYLVANIA, ASSIGNOR TO WESTINGHOUSE ELECTRIC AND MANUFACTURING COMPANY, A CORPORATION OF PENNSYLVANIA.

POWER-TRANSMITTING DEVICE.

1,260,650.  Specification of Letters Patent.  Patented Mar. 26, 1918.

Application filed August 7, 1916. Serial No. 113,459.

*To all whom it may concern:*

Be it known that I, JOEL R. COOK, a citizen of the United States, and a resident of Wilkinsburg, in the county of Allegheny and State of Pennsylvania, have invented a new and useful Improvement in Power-Transmitting Devices, of which the following is a specification.

My invention relates to power-transmitting devices and it has particular relation to a combined driving connection and brake adapted to be employed between a driving member and a driven member, such as the shaft of an electric motor and a suitable load.

It has been found that, where small electric motors are employed to intermittently drive textile machines, sewing machines or similar mechanism, the inertia of the driven members often causes the driving shaft to overrun after power has been shut off from the motor. This results in continued motion on the part of the driven members that has proved particularly destructive to work in which it is essential that the sewing machine needle or other driven member shall come to rest immediately after power is shut off from the motor.

The object of my invention is to provide a driving connection between the rotatable driving and driven members by means of which power will be transmitted between the members only when the torque exerted by the driving member exceeds a predetermined value, the driving member being subjected to a positive braking action whenever the torque falls below that value.

The single figure of the accompanying drawing is a view, partially in section and partially in elevation, of an electric motor provided with a power-transmitting device constructed in accordance with my invention.

The shaft 1 of an electric motor is rotatably mounted in bearings 2 supported by the frame 3 of the motor. One of the bearings 2 is provided with a hollow cylindrical brake drum 4 that surrounds the shaft 1 and is concentric therewith. A collar 5 is mounted on the shaft within the brake drum 4 and is secured thereto by means of a set screw 6. A portion of the shaft 1 projects beyond the brake drum 4, and a pulley 7 is loosely mounted thereon. The pulley 7 is provided with a rim 8 that projects within the brake drum 4 and is formed with a portion 9 of reduced diameter that abuts against the collar 5. The collar 5 is provided with a reduced portion 10 of the same diameter as the portion 9 so that the portions 9 and 10 form a continuous cylindrical surface. The pulley 7 is prevented from longitudinal movement along the shaft 1 by means of a washer 11 and a ring 12. A spring 13 surrounds the portions 9 and 10 and is secured, at its ends, to the collar 5 and the rim 8 of the pulley 7, respectively, the normal diameter of the spring being greater than the inside diameter of the brake drum 4. Assuming the motor to be connected to a source of electrical energy, and the pulley 7 to be connected to a suitable mechanical load, such as the spindle of a textile machine, the operation of my device is as follows:

When current traverses the armature of the motor, the torque exerted thereby causes the collar 5 to wind the spring 13 upon the cylindrical surface presented by the portions 9 and 10. The loosely mounted pulley 7 is then caused to rotate with the shaft 1 to drive the load. When current is cut off from the motor, the torque exerted by the armature falls to a substantially zero value, whereupon the spring 13 expands and engages the inner surface of the brake drum 4, thereby preventing further rotation of the armature shaft 1. Any tendency on the part of the pulley 7 to rotate upon the shaft 1, by reason of the inertia of the driven members will be resisted by the spring 13. Consequently, the sewing machine needle or other driven member will come to rest immediately after current is shut off from the motor.

While the spring 13 has been shown as designed to meet a given braking condition, it is obvious that it may be modified to meet other braking conditions without departing from the spirit or scope of my invention. For instance, if it were found desirable to have the braking take effect only when the pulley tended to drive the motor shaft, the spring would be wound so that its free diameter would be smaller than the diameter of the brake drum although greater than the diameter of the portions 9 and 10. Various other modifications may be made within the scope of the appended claims.

I claim as my invention:

1. The combination with rotatable driving and driven members capable of relative rotative movement, of means for transmitting power between said members and for effecting a braking action upon the driving member.

2. The combination with rotatable driving and driven members capable of relative rotative movement, of means for operatively connecting said members and for effecting a braking action upon the driving member.

3. The combination with rotatable driving and driven members capable of relative rotative movement, of means for alternately transmitting power between said members and for effecting a braking action upon the driving member.

4. The combination with rotatable driving and driven members capable of relative rotative movement, of means connected to the said members for transmitting power between said members and for effecting a braking action upon the driven member.

5. The combination with rotatable driving and driven members capable of relative rotative movement, of means connected to the said members for alternately transmitting power between said members and for effecting a braking action upon the driven member.

6. The combination with rotatable driving and driven members capable of relative rotative movement, of means for causing the said members to rotate together and for effecting a braking action upon the driving member.

7. The combination with rotatable driving and driven members capable of relative rotative movement, of means dependent upon the torque of the driving member for transmitting power between said members and for effecting a braking action upon the driving member.

8. The combination with rotatable driving and driven members capable of relative rotative movement, of means for transmitting power between the said members and for effecting a braking action upon the driving member when the torque exerted thereby falls below a predetermined value.

9. The combination with rotatable driving and driven members capable of relative rotative movement, of a resilient member connected to the driving and driven members for transmitting power between said members and for effecting a braking action upon the driving member.

10. The combination with rotatable driving and driven members capable of relative rotative movement, of a resilient member connected to the driving and driven members for transmitting power between said members and for effecting a braking action upon the driving member when the torque exerted thereby falls below a predetermined value.

11. The combination with rotatable driving and driven members capable of relative rotative movement, of a resilient member connected to the driving and driven members for causing the said members to rotate together when the torque exerted by the driving member exceeds a predetermined value and for effecting a braking action upon the driving member when the torque exerted thereby falls below a predetermined value.

12. The combination with rotatable driving and driven members capable of relative rotative movement, of a resilient member connected to the driving and driven members and adapted by its contraction to cause the said members to rotate together and by its expansion to effect a braking action upon the driving member.

In testimony whereof, I have hereunto subscribed my name this 27th day of July, 1916.

JOEL R. COOK.